United States Patent
Lathrop

(10) Patent No.: US 6,512,540 B2
(45) Date of Patent: *Jan. 28, 2003

(54) ELECTRONIC CAMERA FOR PROCESSING IMAGE SEGMENTS

(75) Inventor: George E. Lathrop, Dansville, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/861,693

(22) Filed: May 21, 2001

(65) Prior Publication Data

US 2001/0020979 A1 Sep. 13, 2001

Related U.S. Application Data

(63) Continuation of application No. 08/954,367, filed on Oct. 20, 1997.

(51) Int. Cl.[7] ................................................ H04N 5/228
(52) U.S. Cl. .............................. 348/222.1; 348/231.99
(58) Field of Search ................................. 348/220, 222, 348/231, 232, 233, 390, 295, 403, 428, 552, 311, 320, 321, 322, 231.99, 231.3, 231.6, 222.1; H04N 5/225

(56) References Cited

U.S. PATENT DOCUMENTS

| | | | | |
|---|---|---|---|---|
| 5,153,730 A | * | 10/1992 | Nagasaki et al. | 348/231 |
| 5,196,938 A | * | 3/1993 | Blessinger | 348/22 |
| 5,920,343 A | * | 7/1999 | Watanabe et al. | 348/222 |

* cited by examiner

*Primary Examiner*—Tuan Ho
(74) *Attorney, Agent, or Firm*—Pamela R. Crocker

(57) ABSTRACT

An electronic still camera includes an image sensor for capturing an original image and generating image signals corresponding to the captured original image, an A/D converter for converting the image signals into original digital image data representative of the captured original image, an image processor for incrementally processing the original digital image data to generate processed image data as each increment is processed and completed, and a non-volatile memory for storing the processed image data, wherein the non-volatile memory also temporarily stores the original digital image data until the incremental processing is completed. The incremental processing of the original image data can then be interrupted in order to capture a new image, while the processed image data for the completed increments of the original image is saved in the non-volatile memory.

36 Claims, 3 Drawing Sheets

ELECTRONIC CAMERA FOR PROCESSING IMAGE SEGMENTS

CROSS-REFERENCE TO RELATED APPLICATIONS

This is a continuation of application Ser. No. 08/954,367, filed Oct. 20, 1997.

FIELD OF THE INVENTION

The invention relates generally to the field of electronic photography, and in particular to digital photography systems that interface with a host computer.

BACKGROUND OF THE INVENTION

Some digital cameras in the prior art, such as the Kodak Digital Science™ Professional DCS 420c Digital Camera, manufactured and sold by Eastman Kodak Company, capture and digitize images from a single charge coupled device (CCD) image sensor and store the resultant digital data as relatively "raw" (unprocessed) data in a non-volatile image memory, such as a PCMCIA-ATA type III removable hard drive. Such "raw" data will typically contain one color value per pixel since the image is captured through an array of color filters. These "raw" images are then transferred to a host computer, which in turn performs numerous image processing operations to render the images usable on an output device such as a monitor or printer. This process requires camera-specific image processing software to be available on the host computer in order to accomplish this image rendering. The image processing performed on the host computer typically includes steps such as interpolating the "raw" color filter array image data into full RGB records (i.e., full color information for each pixel), color matrixing to improve the color reproduction, and tone scale correction to improve the tone scale rendition of the image.

Other cameras described in the prior art, such as the cameras described in U.S. Pat. Nos. 5,477,264; 5,016,107; and 5,528,293, implement similar image processing inside the camera (rather than in a host computer), so that the images stored in the non-volatile memory contain "finished" image data (rather than "raw" data) in a standard file format, such as the JPEG interchange format described in ISO/IEC 10918-1:1994. ("Finished" is herein used to mean that the data has been processed for camera-specific parameters (such as color filter array pattern, color and tone scale anomalies, edge quality, compression, etc.) and then converted into a standardized file format.) This allows the image files to be viewed and utilized by any software package that supports the standard file format, without requiring any camera-specific software on a host computer. Unfortunately, providing "finished file" processing in the camera normally requires that the camera use expensive processing hardware, and/or relatively unsophisticated image processing algorithms, in order to minimize the processing time per picture.

If the processing time per picture is long, either the time the user must wait before taking the next picture will be equally long, or else an expensive, multi-image buffer memory must be provided, as described in the aforementioned U.S. Pat. Nos. 5,477,264 and 5,016,107, so that a new image can be taken while the previous image is being processed. What is needed is a digital camera architecture that enables the camera to provide "finished files" using sophisticated image processing algorithms, without requiring a multi-image buffer memory or expensive real-time image processing hardware, and without requiring the user to wait a long time for the image processing to be completed after each image is captured.

SUMMARY OF THE INVENTION

The present invention is directed to overcoming one or more of the problems set forth above. Briefly summarized, according to one aspect of the present invention, an electronic still camera includes an image sensor for capturing an original image and generating image signals corresponding to the captured original image, an A/D converter for converting the image signals into original digital image data representative of the captured original image, an image processor for processing the original digital image data to generate processed image data, and a non-volatile memory for storing the processed image data, wherein the non-volatile memory also temporarily stores the original digital image data at least until the image processor completes image processing of the original digital image data.

In a further aspect of the invention, the image processor incrementally processes the original digital image data such that processed image data of each increment is stored in the non-volatile memory as each increment of processing is completed, while the non-volatile memory also temporarily stores the original digital image data until the incremental processing is completed. The incremental processing of the original image data can then be interrupted in order to capture a new image, while the processed image data for the completed increments of the original image is saved in the non-volatile memory.

The advantage of the invention is that the camera uses non-volatile transfer memory to store image files as they are incrementally processed, and interrupts this processing whenever the user decides to take a new image. The camera processes images only during the idle times, i.e. times the camera isn't being used to capture an image. When the user wants to capture a new image, the camera "suspends" the image processing operations on the previously captured "older" images, allows the user to capture "new" images, then resumes image processing of the older images, followed by the newer image. This allows the time between captured images to be minimized, without using costly multi-image RAM buffers or high-speed processing hardware.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because digital cameras employing electronic sensors and electronic processing and storage are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed to practice the invention is conventional and within the ordinary skill in such arts.

Figure 1:
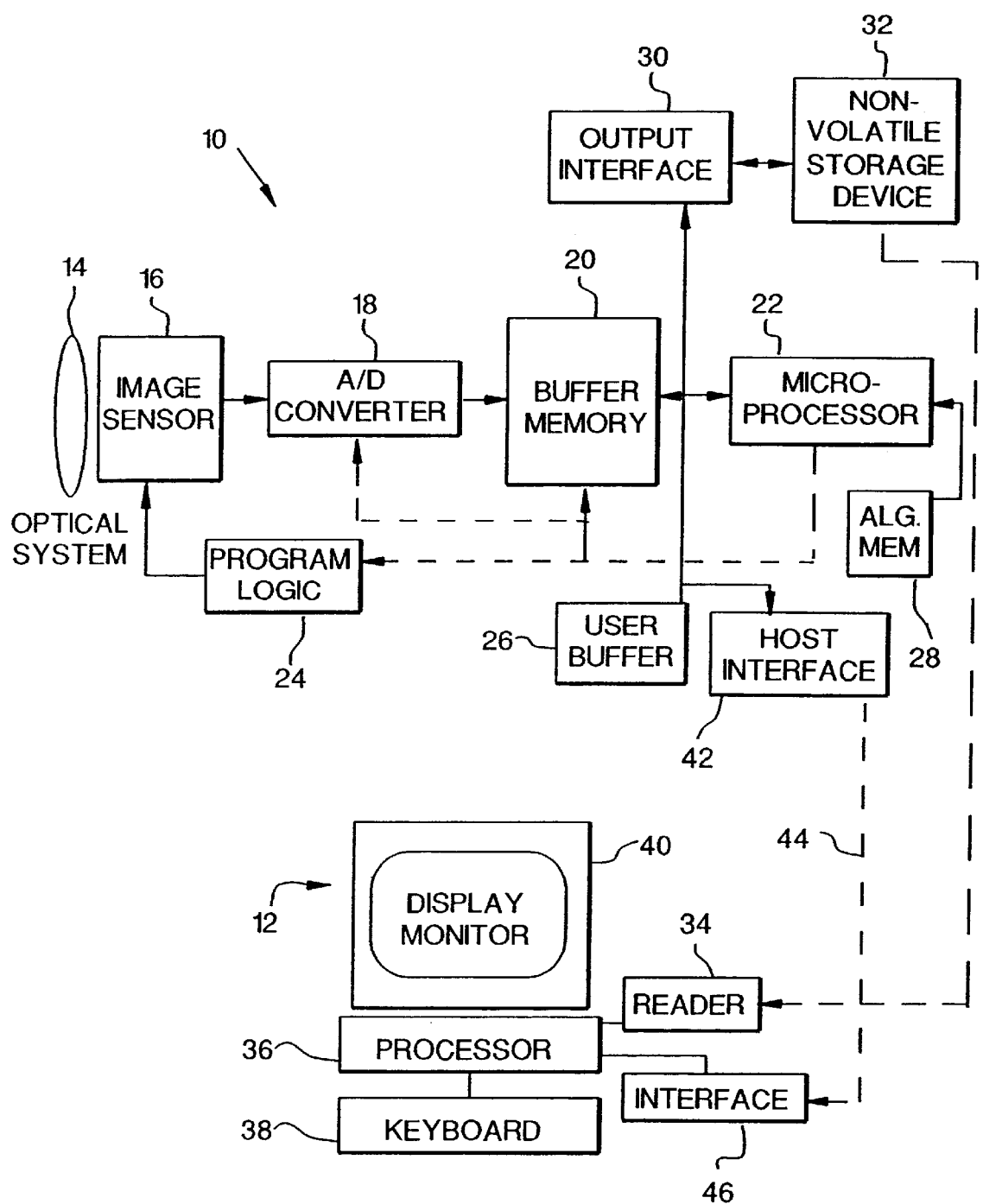
FIG. 1 is a block diagram of a digital still camera system configured according to the invention to process and store finished files in a removable storage device.

FIG. 1 shows a block diagram of a digital still camera 10 capable of capturing and processing images in accordance with the invention. The images are then delivered to a host computer 12. The digital still camera 10 includes a conventional optical system 14 for directing image light from a subject (not shown) to an image sensor 16. Although not shown as separate elements, the optical system 14 includes conventional lens optics for directing the image light through a diaphragm (which regulates the optical aperture) and a shutter (which regulates exposure time). Alternatively, particularly for sensors that have a light protected readout region, the exposure time can be varied by electrically controlling the readout of the image sensor 16 in a conventional manner. The image sensor 16, which includes a two-dimensional array of photosites corresponding to picture elements of the image, is a conventional charge-coupled device (CCD) using, e.g., either well-known interline transfer, progressive scan, or frame transfer techniques. When the sensor 16 is exposed to image light to capture a particular image, analog image information corresponding to the particular image is generated in respective photosites of the sensor 16. The sensor 16 includes a color filter array pattern, such as the Bayer color filter array pattern shown in FIG. 4 and described in U.S. Pat. No. 3,971,065, to provide color image data values. Accordingly, the analog image information output by the sensor 16 represents an uninterpolated stream of unique color values, one value for each pixel, corresponding to the color pattern of the color filter array.

The analog image signals are applied to an A/D converter 18, which generates digital image data from the analog input signals for each picture element. This digital image data is uninterpolated Bayer pattern image data in which each photosite provides a single red, green, or blue value corresponding to its position in the Bayer pattern. The uninterpolated digital image data is applied to a RAM buffer memory 20 having storage capacity for storing one image. A digital microprocessor 22 (for example, a Motorola PowerPC MPC821 processor) generally controls the exposure conditions by generating, via programmable logic 24, the horizontal and vertical clocks needed for driving the sensor 16 and for clocking image information therefrom, and enables the A/D converter 18 in conjunction with the image buffer 20 for each signal relating to a picture element. User interaction with the microprocessor 22 is obtained through a set of user buttons 26, which include a shutter button for initiating an exposure sequence.

The microprocessor 22 performs certain preliminary processing of the uninterpolated Bayer pattern digital image data, including blemish or defect concealment and white balance, as well as the generation of a reduced resolution thumbnail image and a header for the image file according to a first file format. This preliminary processing is not particularly time intensive and does not significantly impact upon the capture timing of the camera. The preliminarily processed data is then transferred via an output interface 30 to a non-volatile storage device 32 and stored in the first file format. While not necessary for practice of the invention, the storage device 32 is a removable storage device, such as a memory card. This preliminarily processed digital image data in the storage device 32 is described herein as "raw" Bayer pattern image data in which the image data in the image file represents a single red, green, or blue value corresponding to its position in the Bayer pattern.

Once "raw" digital image data for the captured image has accumulated in the storage device 32, the stored image data is retrieved in incremental stages by the digital processor 22 and processed according to more comprehensive time-intensive image processing algorithms stored in an algorithm memory 28. These image processing algorithms provide, e.g., color filter array (CFA) interpolation, color correction, tone scale correction, edge enhancement, and compression. The processed image data is then transferred via the output interface 30 to the non-volatile storage device 32 in a second file format. Consequently, the storage device 32 stores the "finished" file data in the second file format and at least temporarily stores the "raw" file data in the first file format. According to the preferred embodiment, the second file format is the aforementioned JPEG file format and the first file format is a TIFF file format, as described in "TIFF revision 6.0, Jun. 3, 1992" available from Adobe Corporation.

Figures 3, 4:
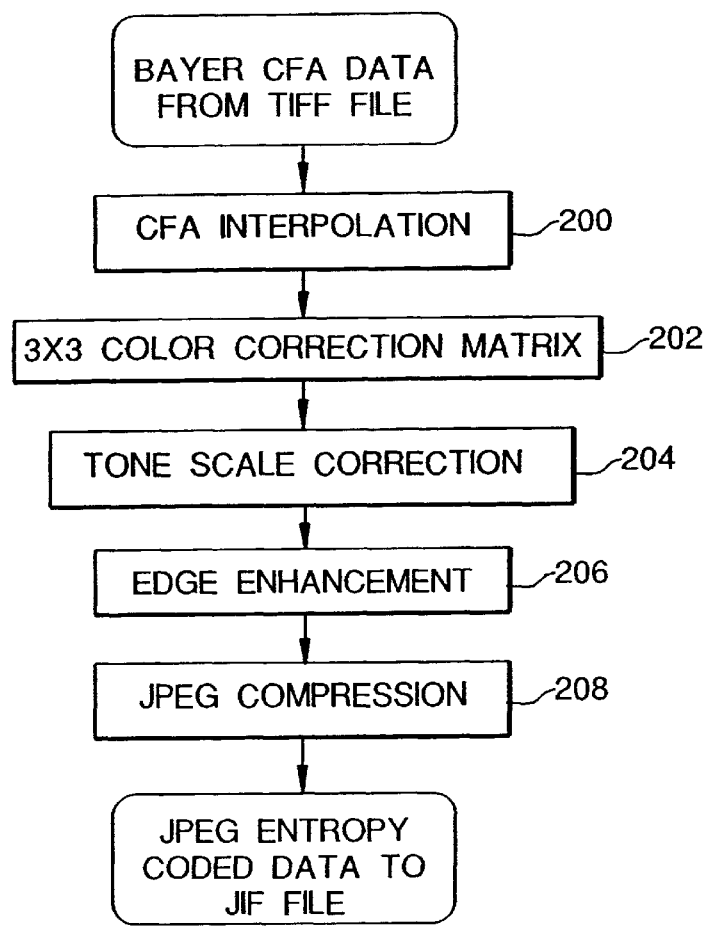
FIG. 3 is a diagram of the image processing steps involved in the generation of finished files.
FIG. 4 is a diagram of the Bayer color filter pattern used in connection with the image sensor in the camera shown in FIG. 1.

According to the invention, the camera architecture is designed to separately process selected increments of the "raw" image data, use the memory of the non-volatile storage device 32 to store the resultant image files as they are incrementally processed, and then to interrupt this processing whenever the user decides to take a new image. This allows the time between captured images to be minimized, without using costly multi-image RAM buffers or high-speed processing hardware. The incremental image processing can divide the image processing algorithms into a number of sequential steps (as shown in FIG. 3), and store the intermediate results after each step in the storage device 32. Or it can divide the image into segments. A segment may, for example, contain the data values for a 16 row by 64 column area of the image. The camera may be interrupted to take a new image during the processing of any particular segment, but the results of any previously processed segments do not need to be re-calculated.

Preferably, the output interface 30 is a memory card interface adapted to the PCMCIA card interface standard (also referred to the PC-Card Standard), such as described in the *PC Card Standard,* published by The Personal Computer Memory Card International Association, Sunnyvale, Calif., March 1997. The storage device 32 accordingly is a non-volatile PCMCIA memory card containing either solid state memory, such as Flash EPROM memory, or a small hard drive (categorized as a PCMCIA-ATA Type III Hard Drive under the PCMCIA card interface standard). Alternatively, other non-volatile storage devices may be used, such as a floppy disk magnetic medium or optical storage (in such cases, a suitable interface and a conventional read/write apparatus would be provided in the camera 10, e.g., a magnetic or optical read/write head).

The digital image data captured and processed by the digital still camera 10 is conveyed to the host computer 12 preferably by removing the storage device 32 from the camera 10 and then inserting the device 32 into a reader 34, e.g., a PCMCIA memory card reader, associated with the computer 12. The computer 12 includes a conventional processor 36, keyboard 38, and monitor 40. In accordance with the invention, the digital processor 22 generates JPEG (Joint Photographic Experts Group) interchange format image files that are stored on the removable storage device 32. Consequently the computer 12 does not require camera-specific processing capability, and need only handle the conventional JPEG format. Instead of conveying the digital image data to the host computer 12 by physically transporting the storage device 32 to the computer 12, the camera 10 may be tethered directly to the computer 12 and the data may be transferred directly to the computer 12 via a host interface 42, such as an IEEE 1394 interface connected via cable 44 to a corresponding interface 46 on the computer. In that case, the storage device 32 would still be used to store the incrementally processed images before they are transferred to the computer 12 via the interface 42. Data transfer via a tethered connection is particularly useful if the particular computer in use does not have a reader 34.

Figure 2:
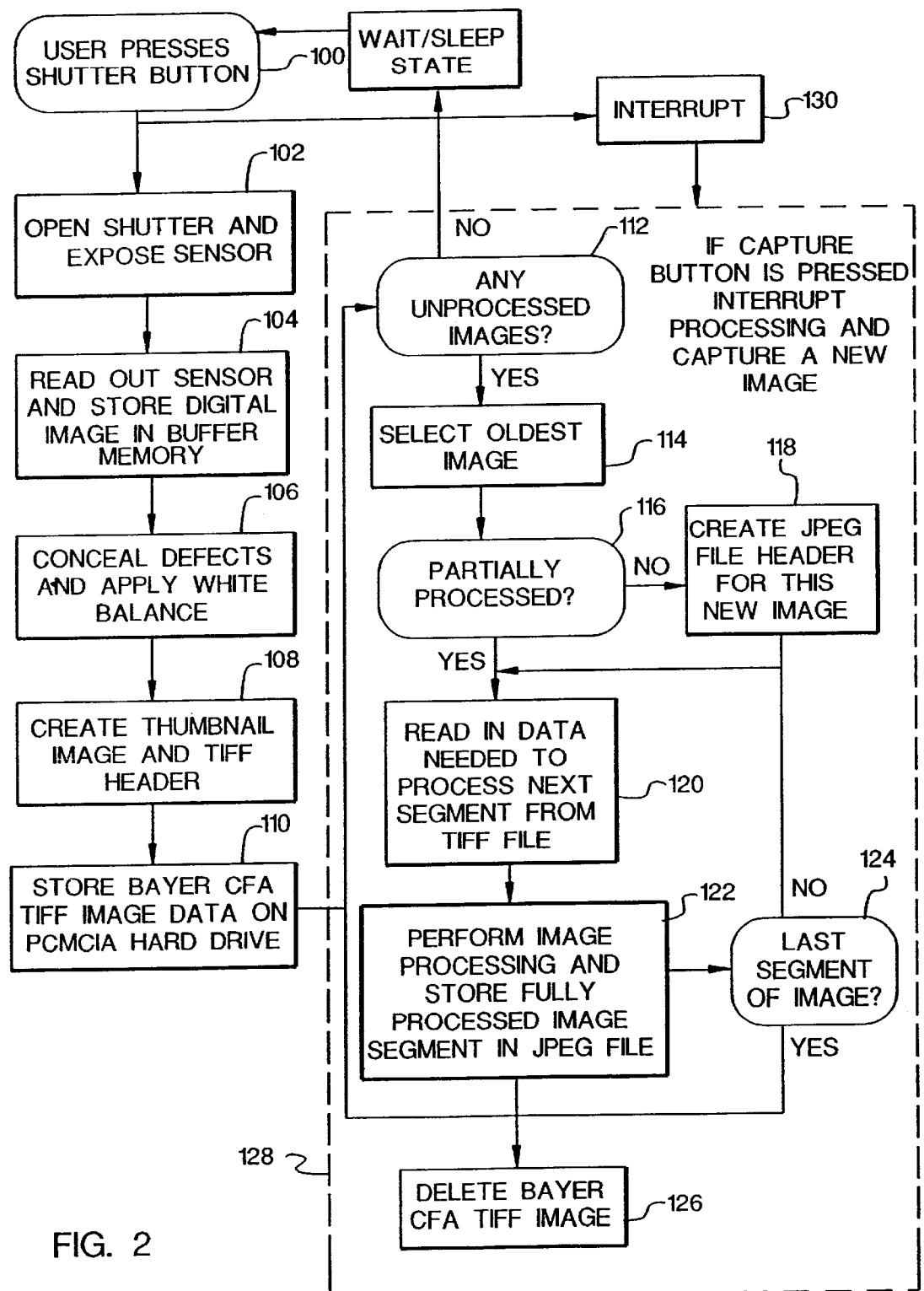
FIG. 2 is a flow diagram describing the operation of the camera shown in FIG. 1 in relation to incremental image processing performed according to the invention.

FIG. 2 shows the steps involved in taking and processing pictures with the system shown in FIG. 1, wherein the incremental processing is done on segments of the image. The sequence is initiated by the user pressing the shutter button (step 100) in the user button section 26. The camera 10 then opens the shutter (step 102) in the optical section 14 and focuses light reflected from the scene onto the image sensor 16. While many different types of sensors may be employed, the image sensor may be, for example, a Kodak KAF-1600 CCD sensor, which has 1024 lines and 1536 pixels per line for a total of about 1.5 million pixels. As explained hereinbefore, the sensor 16 includes a Bayer color filter array pattern (FIG. 4) to provide color image data values from the sensor 16. Next the sensor 16 is read out and the digital data is stored in the buffer memory (step 104). In the preferred embodiment, the sensor 16 is read out and digitized by the A/D converter 18 at about 6 Msamples/second and converted to an 8 bit non-linearly quantized sample value. Thus, it would take approximately ⅓ second to read out the image sensor data and store the data in the buffer memory 20. If the buffer memory 20 contains 2 Mbyte of storage, the memory 20 can store a single 1.5 Mbyte uninterpolated Bayer color image record, with approximately 400 Kbytes remaining for use in image processing.

Next (in step 106), the microprocessor 22 reads the image data from the buffer memory 20 and performs simple image processing (for example, image defect concealment and white balance). A reduced resolution thumbnail image is generated along with a TIFF header (step 108) and stored together with the essentially "raw" image data in the non-volatile, storage device 32 (step 110), which in the preferred embodiment incorporates a PCMCIA-ATA type III hard drive. This image data is stored using the TIFF image format, as described in "TIFF revision 6.0, Jun. 3, 1992" available from Adobe Corporation. These "raw" Bayer pattern TIFF images can, according to the prior art, be downloaded to the host computer 12, which then would need to perform final image processing, including converting the Bayer color data into interpolated full resolution RGB color image data. However, this requires that the host computer 12 have the specific software needed to convert these "raw" image files into standard color image data files.

Because of the minimal processing required, the time between starting the sensor readout and completely storing the Bayer pattern TIFF file in the storage device 32 is short (for example, 2 seconds). Once the "raw" image is stored in the storage device 32, the camera is ready to take another picture, as soon as the user again presses the shutter button in the user button section 26. However, if the user does not immediately press the shutter button, the microprocessor 22 in the camera begins to perform image processing of the stored "raw" Bayer pattern TIFF image, in order to create a "finished" JPEG interchange format image file format as described in ISO/IEC 10918-1:1994. The microprocessor 22 checks to see how many unprocessed TIFF images exist (step 112), and begins to process the first unprocessed segment of the oldest TIFF image (step 114). A segment may, for example, contain the data values for a 16 row by 64 column area of the image.

The oldest image is first checked to determine if it is partially processed (step 116). If the oldest image has no processed segments, the microprocessor 22 begins to create a new JPEG file (step 118) by writing the JPEG header information, which includes the start of image and start of image JPEG segments, as well as an application segment, such as the Exif application segment described in "Digital Still Camera Image File Format Standard" (Exit), version 1.1, Japan Electronic Industry Development Association (JEIDA), May, 1997. This Exif application marker includes the TIFF thumbnail data and other TIFF tags, for examples the Date Time tag and the Fnumber tag.

The microprocessor 22 then processes each image segment (step 122) using the processing steps shown in FIG. 3. Exemplary steps include CFA interpolation 200, color correction 202, tone scale correction 204, edge enhancement 206, and JPEG compression 208. Typical CFA interpolation techniques for a Bayer pattern are described in U.S. Pat. Nos. 5,506,619 and 5,629,734. Examples of typical color correction, tone scale correction and edge enhancement are found in *Digital Image Processing,* 2nd ed., by William Pratt, Wiley, 1991 and *Fundamentals of Digital Image Processing,* by A. K. Jain, Prentice-Hall, 1989. The color image data may also be converted into JPEG standard color space (YCC CCIR 709 space) and downsampled to improve the compression ratio for chroma. A typical JPEG compression algorithm is the Discrete Cosine Transform (DCT). The processor begins by reading from the TIFF file the data needed to process the next segment (step 120). This data may be slightly larger than the 16×64 pixel segment, since the values of "neighbor" pixels are needed to properly perform the color filter array and edge enhancement processing. After the segment processing is completed, the microprocessor 22 checks to see if this was the last segment of the image (step 124). If there are more segments, then data needed for the next segment is read from the TIFF file (step 120) and that segment is processed (step 122).

The JPEG interchange format (JIF) file is complete after the last segment of the image has been processed. This process may take approximately 20 seconds per image, much longer than the time to capture and store the "raw" TIFF file. After all image segments are fully processed, the TIFF file corresponding to the unprocessed image can be deleted (step 126).

The purpose of saving each incremental step (i.e. saving the result of processing each segment) is to maintain earlier processing in case the user attempts to take another picture before the processing shown in FIG. 3 is completed for the entire image (i.e. within 20 seconds of taking the last image). During any of the processing steps shown within the right-hand box 128 in FIG. 2, if the user wants to capture a new image, the shutter button in the user button section 26 is pressed, an interrupt section 130 is enabled and processing is returned to the capture sequence (steps 102–110). In particular, the processing of the current segment (step 122) is halted (or alternately, aborted) and the user is allowed to capture a new image (step 102), which is immediately processed (according to steps 104–108) and stored on the removable storage device 32 (step 110). Following the image capture(s) and storage, the previously halted incremental image processing step 122 is resumed at the point of interruption (or the aborted segment is reprocessed). With this approach, the portion of the image processing that is lost is minimized to (at worst) the incremental step which was aborted and not to any previous incremental steps. This incremental image processing continues until the image is finished.

While this example showed the incremental image processing performing the full set of algorithms on many (24×64=1536) image segments, it is also possible to completely process the full image sequentially using each algorithm shown in FIG. 3, and storing the intermediate results in the non-volatile memory, or by sequentially storing the output of each processing step for each segment in the non-volatile memory 32. In these two cases, after finishing a subsequent incremental step, the microprocessor 22 would erase the results of the previous step.

In summary, the invention is a camera architecture that uses the camera non-volatile transfer memory (such as a PCMCIA type III hard drive) to store image files as they are incrementally processed, and interrupts this processing whenever the user decides to take a new image. In effect, the camera processes images only during the idle times, i.e. times the camera isn't being used to capture an image. When the user wants to capture a new image, the camera "suspends" the image processing operations on the previously captured "older" images, allows the user to capture "new" images, then resumes image processing of the older images, followed by the newer image. This allows the time between captured images to be minimized, without using costly multi-image RAM buffers or high-speed processing hardware.

In the preferred embodiment, the image processing is divided into a number of sequential steps, and the intermediate results are stored after each step. If the camera is interrupted during any particular step, that step is repeated when the processing is resumed after the new images are captured. In a second embodiment, all of the steps are performed on image "segments" (strips or blocks of image data), and the result of each segment is stored in the image file. This can be done by separating the JPEG entropy coded data using a "restart marker" at the end of each segment. The use of restart marker codes to delineate the compressed data representing a segment within an image is described in copending Ser. No. 60/042,221, entitled "Multi-Format Compatible Image File Format", filed on Apr. 15, 1997 in the names of Kenneth A. Paruiski, Joseph Ward, George E. Lathrop, J. Scott Houchin, Eddie Jennings, and Brett Vansprewenburg and assigned to the assignee of the present invention, which is incorporated herein by reference).

For instance, according to Ser. No. 60/042,221, restart markers can be added to the entropy coded JPEG image in order to define 64×64 pixel (4096 pixel) tiles that allow easy transcoding to other formats, such as the FlashPix standard. Compressed image data in the JPEG stream thus contains restart markers at the beginning of every JPEG block that begins a new 64-pixel boundary. More specifically, each 64×64 pixel tile includes an 8×8 group (64 total) of luminance DCT (discrete cosine transform) blocks and a 4×4 group (16 total) of chroma (color difference component Cb and Cr) DCT blocks. Each macroblock consists of 4 luminance and 1 each Cb and Cr chrominance block. Therefore, restart markers may be placed after appropriate groups of macroblocks to define the segments according to the present invention.

The camera may be interrupted during the processing of any particular segment, but the results of any previously processed segments do not need to be re-calculated. Only the segment being processed when the camera was interrupted needs to be reconsidered. In a third embodiment, the approaches of the first two embodiments are combined, so that the image processing of each segment is divided into a number of sequential steps, and the intermediate results are stored after each step of each segment.

The invention has been described with reference to a preferred embodiment. However, it will be appreciated that variations and modifications can be effected by a person of ordinary skill in the art without departing from the scope of the invention.

PARTS LIST 10 digital still camera
12 host computer
14 optical system
16 image sensor
18 A/D converter
20 RAM buffer memory
22 digital microprocessor
24 programmable logic
26 user button section
28 algorithm memory
30 interface
32 removable, non-volatile storage device
34 card reader
36 processor
38 keyboard
40 monitor
42 host interface
44 cable
46 interface

What is claimed is:

1. An electronic still camera for capturing original images and performing image processing on the original images, said camera comprising:
    (a) an image sensor for capturing original images and generating image signals corresponding to each original image, each original image having a like number of rows and columns of pixels;
    (b) an A/D converter for converting the image signals from each original image into digital image data representative of each original image;
    (c) a first memory for storing the digital image data representative of at least a portion of an original image;
    (d) an image processor for receiving from the first memory a series of incremental segments of digital image data of an original image, each incremental segment having at least eight rows of pixels not previously provided to the image processor but having less than one half the number of rows of pixels in the original image, and for generating processed image data segments; and
    (e) a second memory for storing the processed image data segment as the processing of each incremental segment is completed.

2. An electronic still camera as claimed in claim 1 wherein the original image data is stored in a first file format and the processed image data is stored in a second file format.

3. An electronic still camera as claimed in claim 2 wherein the original image data is stored in a TIFF file format and the processed image data is stored in a JPEG file format.

4. An electronic still camera as claimed in claim 1 wherein the image processor can be interrupted in order to capture another image while retaining the stored processed image data segments in the second memory.

5. An electronic still camera as claimed in claim 4 wherein after capture of the subsequent image, the image processor completes processing of the unprocessed segments of the original image and stores such processed segments in the second memory.

6. An electronic still camera as claimed in claim 1 wherein the processed segments are stored in a JPEG interchange format bitstream separated by restart markers.

7. An electronic still camera as claimed in claim 1 wherein the first and second memories are provided by a removable memory card.

8. An electronic still camera as claimed in claim 7 wherein the results of each incremental segment are stored in the removable memory card as the processing for each incremental segment is completed.

9. An electronic still camera as claimed in claim 1 wherein the memory is either solid-state or magnetic media.

10. An electronic still camera as claimed in claim 1 wherein each incremental segment of digital image data of the original image has an equal number of rows and columns of pixels.

11. An electronic camera as claimed in claim 10 wherein each incremental segment of digital image data of the original image has sixty four rows and sixty four columns of pixels.

12. An electronic still camera as claimed in claim 1 wherein the processing of the series of incremental segments of digital image data of the original image provides color correction.

13. An electronic still camera as claimed in claim 1 wherein the processing of the series of incremental segments of digital image data of the orginal image provides edge enhancement.

14. An electronic still camera as claimed in claim 1 wherein the processing of the series of incremental segments of digital image data of the original image provides color correction, edge enhancement, and JPEG compression.

15. An electronic still camera as claimed in claim 1 wherein the processing of the series of incremental segments of digital image data of the original image provides JPEG compression.

16. An electronic still camera as claimed in claim 1 wherein the processing of the series of incremental segments of digital image data of the original image provides CPA interpolation.

17. A method utilizing an electronic still camera for capturing original images and performing image processing on the original images, said method comprising the steps of:

(a) generating a capture signal in order to initiate an image capture of an original image;

(b) capturing original images and generating image signals corresponding to each original image, each original image having a like number of rows and columns of pixels;

(c) converting the image signals from each original image into digital image data representative of each original image;

(d) storing the digital image data representative of at least two original images in a first memory;

(e) processing a series of segments of digital image data of a first original image to generate first processed image data segments, each segment having a plurality of rows or columns of pixels, wherein the number of rows or columns of pixels of each segment is less than the number of rows or columns of pixels in the first original image, respectively, (f) storing the first processed image data segments in a second memory as the processing of each segment is completed; and (g) interrupting the processing of the first original image in order to capture and store a second original image into the first memory, and then resume processing of the unprocessed segments of the first original image.

18. A method as claimed in claim 17 wherein each segment of digital image data of the first original image has an equal number of rows and columns of pixels.

19. A method as claimed in claim 18 wherein each segment of digital image data of the first original image has sixty four rows of pixels and sixty four columns of pixels.

20. A method as claimed in claim 17 wherein the processing step provides color correction.

21. A method as claimed in claim 17 wherein the processing step provides edge enhancement.

22. A method as claimed in claim 17 wherein the processing step provides JPEG compression.

23. A method as claimed in claim 17 wherein the processing step further provides color correction, edge enhancement, and JPEG compression.

24. A method as claimed in claim 17 wherein the processing step provides CFA interpolation.

25. An electronic still camera for capturing original images and performing image processing on the original images, said camera comprising:

(a) an image sensor for capturing original images and generating image signals corresponding to each original image, each original image having a like number of rows and columns of pixels;

(b) an A/D converter for converting the image signals from each original image into digital image data representative of each original image;

(c) a first memory for storing the digital image data representative of at least two original images;

(d) an image processor for processing a series of segments of digital image data of a first original image to generate first processed image data segments, each segment having a plurality of rows and columns of pixels wherein the number of rows or columns of pixels of each segment is less than the number of rows or columns of pixels in the first original image, respectively, and (e) a second memory for storing the processed image data segments as the processing of each segment is completed;

(f) wherein the image processor interrupts the processing of the first original image in order to capture and store a second original image into the first memory, and then resumes processing of the unprocessed segments of the first original image.

26. An electronic still camera as claimed in clam 25 wherein the processing of the series of incremental segments of digital image data of the original image provides JPEG compression.

27. An electronic still camera as claimed in claim 25 wherein the processing of the series of incremental segments of digital image data of the original image provides CFA interpolation.

28. An electronic still camera as claimed in claim 25 wherein the digital image data of the first original image is stored in a first file format and the first processed image data segments are stored in a second file format.

29. An electronic still camera as claimed in claim 28 wherein the digital image data of the first original image is stored in a TIFF file format and the first processed image data segments are stored in a JPEG file format.

30. An electronic still camera as claimed in claim 25 wherein the first processed image data segments are stored in a JPEG interchange format bitstream separated by restart markers.

31. An electronic still camera as claimed in claim 25 wherein the first and second memories are provided by a removable memory card.

32. An electronic still camera as claimed in claim 25 wherein each segment of digital image data of the first original image has an equal number of rows and columns of pixels.

33. An electronic still camera as claimed in claim 32 wherein each segment of digital image data of the first original image has sixty four rows and sixty four columns of pixels.

34. An electronic still camera as claimed in claim 25 wherein the processing of the series of segments of digital image data of the first original image provides color correction.

35. An electronic still camera as claimed in claim 25 wherein the processing of the series of segments of digital image data of the first original image provides edge enhancement.

36. An electronic still camera as claimed in claim 25 wherein the processing of the series of segments of digital image data of the first original image provides color correction, edge enhancement, and JPEG compression.

* * * * *